March 10, 1953  H. J. OGORZALY  2,631,124
MAGNETIC DECONTAMINATION OF CRACKING CATALYST
Filed June 18, 1946
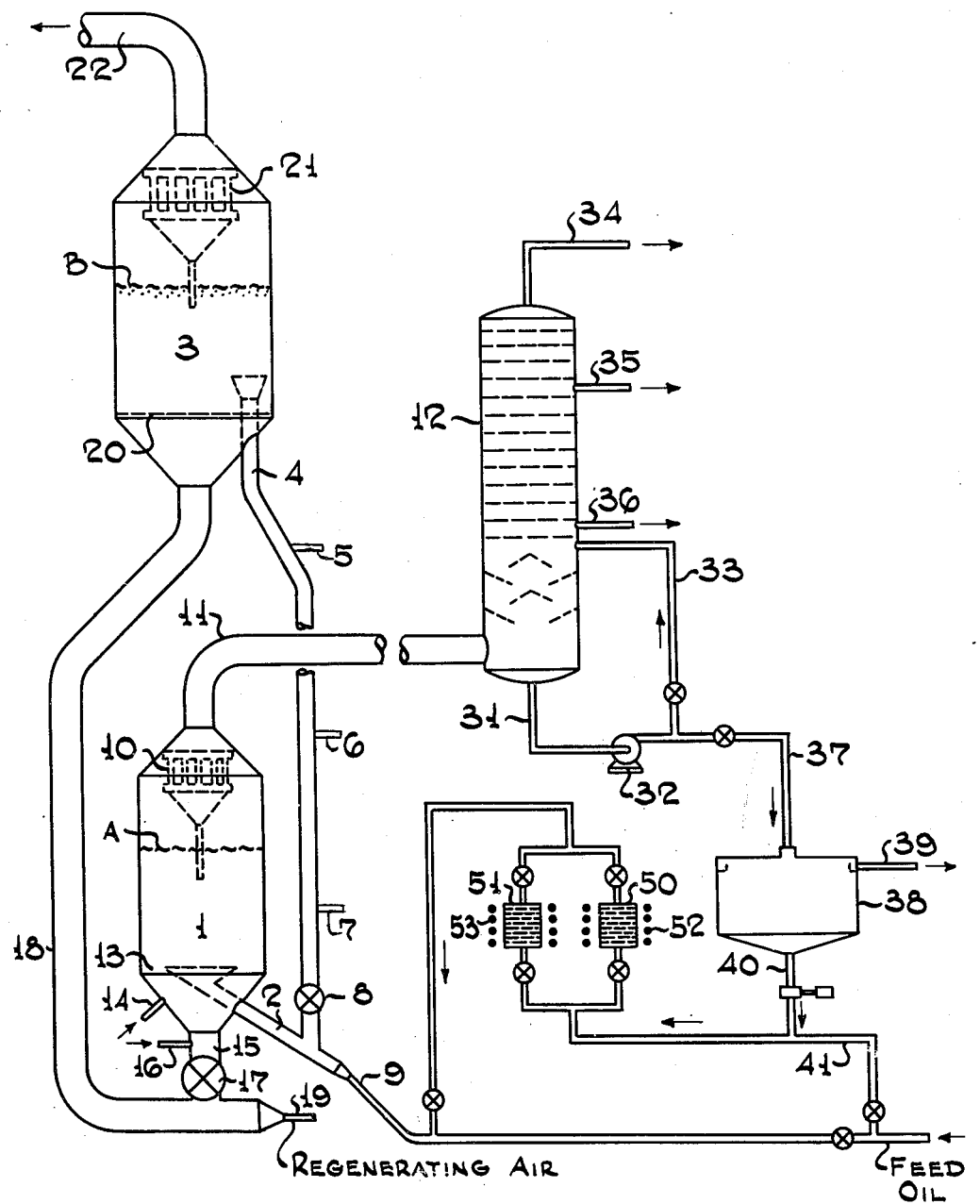
Henry J. Ogorzaly Inventor
By T. J. Whelan Attorney Patented Mar. 10, 1953

2,631,124

UNITED STATES PATENT OFFICE 2,631,124

MAGNETIC DECONTAMINATION OF CRACKING CATALYST

Henry J. Ogorzaly, Summit, N. J., assignor to Standard Oil Development Company, a corporation of Delaware Application June 18, 1946, Serial No. 677,502

3 Claims. (Cl. 196—52)

The present invention is concerned with a process for the improvement of a fluid catalytic operation. It is primarily concerned with a method by which catalyst contamination is reduced. In accordance with the present invention, contamination of the catalyst, particularly with respect to iron, is maintained at a relatively low level by magnetic separation means. The magnetic separation means is utilized to treat a selected liquid slurry of the reaction products in order to remove therefrom, small undesirable iron particles. In accordance with my invention I remove these undesirable iron particles, which contaminate the catalyst, by treating the bottom stream of the reaction products secured in a fractionation operation.

It is well known in the art to conduct various reactions using a fluid catalyst. In these reactions, the catalyst generally comprises particles having a particle size in the range from about 5 to about 160 microns and higher. These catalyst particles are generally suspended in a fluid space by means of the superficial velocity of the upflowing gases. In general, the upper levels of the catalyst bed in the reaction and regeneration zones are maintained at a predetermined level. The feed gases are passed upwardly through the catalyst bed in the reaction zone and withdrawn through a cyclone separator wherein catalyst particles are separted from the reactant gases. In operations of this character, it has been found that due to the effect of fluid solid catalyst particles impinging on the metallic iron surfaces of the reaction equipment, the catalyst takes up impurities which comprise small particles of iron. For example, it has been found that cracking catalysts, such as a silica-alumina catalyst, a silica-magnesia catalyst, or an activated clay catalyst, show an appreciable increase in their iron content in a relatively short period of time. This increase in iron content is particularly undesirable because of the fact that with continued mechanical agitation the small iron particles are incorporated into the catalyst and markedly alter its characteristics. Not only is the productive activity of the catalyst lowered, but also a very large increase in the yields of gas and coke occur.

I have now discovered a process by which these iron particles are readily removed from the catalyst before they are closely incorporated into the catalyst. By operating in accordance with my process the contamination of the catalyst is maintained at a relatively low value.

In accordance with my invention the reaction gases removed from the reaction zone are passed to a distillation or fractionation means. Since the undesirable iron particles are relatively small, fine particles, these pass along with fine catalyst particles with the reaction vapors into the distillation equipment. Temperature and pressure conditions are maintained in the distillation equipment to segregate and remove the streams of the desired specifications. The bottoms stream comprising a relatively small amount of the reaction products and containing the fine catalyst and iron particles, in accordance with my invention, is passed to a settling tank. An oil product stream, substantially free of solid particles, may be withdrawn from the separation tank. The bottoms stream from the separation zone comprising a slurry of oil and fine catalyst and iron particles, in accordance with my process, is passed through an electro-magnetic means wherein conditions are adjusted to remove the particles comprising iron from the oil by electro-magnetic means.

The process of my invention may be more readily understood by reference to the attached drawing illustrating one modification of the same. For the purpose of illustration, I will describe my invention in conjunction with a fluid catalytic cracking operation wherein a silica-magnesia, or a silica-alumina, or a similar satisfactory catalyst is employed.

Oil feed and catalyst are introduced into reaction zone 1 by means of feed line 2. Fluid catalyst is withdrawn from regeneration zone 3 by means of standpipe 4. The catalyst in the standpipe 4 is maintained in the aerated state by injection of air through lines 5, 6 and 7. The hot regenerated aerated catalyst flows from standpipe 4 through slide valve 8 and is mixed with either liquid or vapor feed entering through line 9 to form the mixed feed to the reaction zone. The catalyst level in reaction zone 1 is maintained at point A. The reaction zone is maintained at suitable temperature and pressure in order to secure the desired reaction. After a sufficient time of contact the reaction vapors are removed from reaction zone 1 through cyclone separator 10 maintained in the upper section of reaction zone 1, wherein the major part of the entrained catalyst particles are removed from the vapors. Reaction vapors containing small particle fines are removed overhead by means of line 11 and are passed to fractionation means 12.

Spent catalyst is withdrawn from the reaction zone 1 through annular passageway 13 in which it is stripped by means of steam introduced through line 14. From the stripping zone the catalyst passes into standpipe 15 where it is maintained in an aerated condition by steam introduced through line 16. The spent catalyst passes from standpipe 15 through slide valve 17 into line 18 where it is suspended in and mixed with regenerating air or other oxygen containing regenerating medium introduced through line 19. The mixture of catalyst plus regeneration gases passes into regeneration zone 3 through distributing grid 20. The catalyst in regeneration zone 3 is maintained in a dense fluidized bed with an upper level at point B for a sufficient period of time and at a temperature level to permit the combustion of the deposited carbon. Vapors leaving the bed are passed through cyclone separation means 21 in which the major part of the catalyst entrained in the escaping gases is separated and returned to the dense bed. The substantially catalyst-free overhead gases are withdrawn through line 22. Residual catalyst and a portion of the heat content are normally recovered from these escaping gases before they are vented to the atmosphere in a manner which has been previously disclosed and which is not germane to the present case.

The reaction vapors introduced into the fractionation means 12 through line 11 are normally scrubbed in the lower portion of fractionating means 12 by means of a bottoms stream 31. This stream is circulated by pump 32 and a major portion is recycled through line 33 to the top of the washing section, through which it descends in countercurrent contact with the rising product vapor streams. By this means vapors rising into the fractionation section proper of fractionating means 12 are scrubbed free of entrained catalyst dust. These dust-free vapors are fractionated by standard methods into product streams 34, 35 and 36. A small portion of the circulating scrubbing liquid stream is regularly withdrawn through line 37 and directed to a settling zone 28, from which a clarified dust-free oil stream is withdrawn through line 39. Substantially all of the catalyst and metal contaminant originally present in the vapors leaving reaction zone 1 through line 11 are thus concentrated into a heavy bottoms stream drawn from the bottom of settling zone 38 through line 40. This heavy stream is normally diluted by the addition through line 41 of a portion of the oil feed and may be recycled directly to the reaction zone or introduced into the reaction zone in admixture with the remainder of the oil feed. The amount of oil feed admixed with this heavy stream should preferably be an amount sufficient to reduce the catalyst in the slurry below about one pound per gallon. The heavy slurry containing the contaminated iron particles may be purified of its iron content by alternate passage through either of the magnetic separating means 50 and 51.

Magnetic separation means 50 and 51 may comprise vessels containing a magnetizable internal core of soft iron. The vessels are surrounded by electrical coils 52 and 53 through which direct current is passed to induce a state of magnetism in the central core. The magnetizable core may comprise perforated plates, woven screens, grids, and the like. In general, it is desirable to have a large free area within the core combined with a tortuous path imposed upon the flowing oil containing the catalyst fines and the undesirable particles comprising iron. As the oil containing these undesirable particles comprising iron flows through magnetic separating zones 50 and 51, the iron particles contact the magnetized core and are held on its surface. The type of structure employed in the magnetic separation means may be varied appreciably. The structure generally is of the type that an electromagnetic field can be imposed sufficient to attract iron particles from the flowing oil stream to a magnetized surface contained within the field and magnetized thereby. I alternately pass the oil stream through zones 50 and 51 and remove the iron particles from one surface while the oil stream is flowing through the alternate zone.

My invention comprises generally the application of a preferential magnetic field upon a selected stream for the separation of undesirable particles comprising iron from the catalyst. My invention is particularly adapted to a catalytic cracking operation. I propose to carry out the separation at wet conditions, that is, while the solids are being treated or suspended in the liquid medium and under conditions of relatively dilute suspension. The particular fraction which I employ is the slurry catalyst fraction which consists of fine catalyst particles scrubbed from the product vapors in the bottom of the fractionating tower and returned to the cracking reactor in suspension in a fractionator tower bottoms stream. This catalyst containing fractionator bottoms stream is preferably passed through a settling zone in which the bulk of the catalyst particles are settled out. The major part of the fractionator bottoms is separated as a clarified oil comprising one of the product streams. In this operation the bulk of the catalyst fines and a minor portion of the fractionator bottoms stream are removed from the bottom of the settling zone and are preferably admixed into a stream of auxiliary suspending oil introduced by means of line 41, which may be feed oil or a cracked cycle oil. This reslurry stream, with the catalyst in a relatively dilute suspension of the order of from about 0.1 to 1.0 pound of solid per gallon of reslurry oil, is returned to the cracking section through the electro-magnetic means as described.

Many advantages are secured from my invention. For example, a greater portion of the iron associated with the catalyst is in the metallic condition, and consequently, is in a more highly magnetic state, than at any other point in the system. This is due to the fact that the fraction I treat has been repeatedly exposed to the reducing conditions in the reactor without intervening oxidation. Furthermore, the iron or iron oxide concentration in this part of the system is higher than in any other part. There is no direct removal of catalyst from this point of the system and the fine particles of iron produced by erosion of equipment tend to concentrate in the fine catalyst stream. Also, there is little dilution of the fine iron particles by the relatively lower iron content catalyst particles exceeding 20 microns in size. Another advantage secured is that by treating the solid particles at this point of the system, the fine iron particles are removed immediately after they are formed by erosion in the dust separating equipment on the reactor side, before they have an opportunity for integration with the catalyst by extensive mechanical mixing. Also treatment of the solid in the form of a dilute suspension is particularly effective in permitting good fractionation between particles of varying magnetic susceptibility.

The nature of the present invention having been thus fully set forth and specific examples of the same given, what is claimed as new and useful and desired to be secured by Letters Patent is:

1. In a fluid catalytic cracking process wherein a finely divided catalyst selected from the group consisting of silica-alumina, silica-magnesia and activated clay is circulated back and forth between a reaction zone, through which vaporized hydrocarbon feed is passed upwardly in contact with a dense fluid bed of the catalyst, and a regeneration zone through which an oxygen-containing gas is passed to burn carbon deposits off the catalyst, and the catalyst becomes contaminated with magnetic iron impurities, and wherein catalyst entrained in the vaporous reaction products leaving the said reaction zone is mechanically separated therefrom and returned to the reaction zone, and the resulting vaporous reaction products containing a small residual amount of entrained iron-contaminated catalyst fines are passed to a fractionation zone to separate therefrom a gasoline distillate fraction and a slurry of contaminated catalyst fines contained in a higher boiling hydrocarbon bottoms fraction, the improvement which comprises withdrawing from the fractionation zone the separated slurry of contaminated catalyst fines and hydrocarbon bottoms, passing the withdrawn slurry in a tortuous path through an electro-magnetic zone to remove fine particles comprising magnetic iron contaminants from the slurry, and then recycling the decontaminated catalyst slurry to the reaction zone.

2. A process according to claim 1 which comprises the specific step of passing the hydrocarbon slurry containing contaminated catalyst fines and hydrocarbon bottoms from the fractionation zone to a settling zone to concentrate the slurry, removing a stream of clarified oil from the settling zone, separately withdrawing from the settling zone a concentrated slurry containing the catalyst fines and hydrocarbon bottoms, and passing the slurry through the electro-magnetic decontamination zone to remove iron contaminants therefrom.

3. In a catalytic cracking process using a finely divided fluidized catalyst selected from the group consisting of silica-alumina, silica-magnesia and activated clay, wherein the catalyst becomes contaminated with particles comprising magnetic iron while being circulated back and forth between a reaction zone and a regeneration zone in which carbon deposits are burned off the catalyst fluidized by an upwardly passing oxygen-containing gas, and wherein vaporized hydrocarbon feed is passed upwardly through the reaction zone in contact with the fluidized catalyst, and wherein the catalyst is separated from the vaporous reaction products leaving said reaction zone and returned to the reaction zone, and separated vaporous reaction products containing a small residual amount of entrained iron-contaminated catalyst fines are passed to a fractionation zone to separate therefrom a gasoline fraction and a higher boiling hydrocarbon condensate containing contaminated catalyst fines as a slurry, the improvement which comprises separately withdrawing the hydrocarbon slurry containing contaminated catalyst fines from the fractionation zone, passing the withdrawn slurry to a settling zone where it is concentrated, withdrawing clarified oil from said settling zone, also withdrawing therefrom a concentrated slurry containing catalyst fines and magnetic iron contaminants, diluting the withdrawn concentrated slurry with fresh oily hydrocarbon feed to reduce the solids content of the resulting diluted slurry to about 0.1 to 1.0 lb. per gallon of oil, passing the diluted mixture in a tortuous path through an electro-magnetic zone under large surface area conditions to remove fine particles comprising magnetic iron contaminants from the diluted slurry, and recycling the decontaminated diluted slurry from the electro-magnetic zone to said reaction zone.

HENRY J. OGORZALY.

REFERENCES CITED

The following references are of record in the file of this patent:

UNITED STATES PATENTS

| Number | Name | Date |
|--------|------|------|
| 1,799,858 | Miller | Apr. 7, 1931 |
| 2,330,995 | Rietz | Oct. 5, 1943 |
| 2,350,759 | Hilmer et al. | June 6, 1944 |
| 2,430,157 | Byrd | Nov. 4, 1947 |
| 2,471,078 | Ogorzaly | May 24, 1949 |

OTHER REFERENCES

Berry: Chemical Engineers Handbook, 2nd ed., 1941, p. 1731, McGraw-Hill Book Co.

Murphree et al.: The Oil and Gas Journal, Mar. 3, 1945, pp. 64, 67, 71, 72, 75, 79, 81.